United States Patent [19]
von Strandtmann et al.

[11] 3,880,861
[45] Apr. 29, 1975

[54] SUBSTITUTED-O-HYDROXY-ω-(METHYL-SULFINYL)ACETOPHENONES AND PROCESS FOR PRODUCING SAME

[75] Inventors: Maximilian von Strandtmann, Rockaway; John Shavel, Jr., Mendham; Sylvester Klutchko, Hackettstown; Marvin Cohen, New Milford, all of N.J.

[73] Assignee: Warner-Lambert Company, Morris Plains, N.J.

[22] Filed: Jan. 17, 1974

[21] Appl. No.: 434,161

Related U.S. Application Data

[62] Division of Ser. No. 174,947, Aug. 25, 1971, Pat. No. 3,801,644.

[52] U.S. Cl. .................. 260/283 S; 260/294.8 R
[51] Int. Cl. ............................................ C07D 33/60
[58] Field of Search ................................ 260/283 S

[56] References Cited
UNITED STATES PATENTS
3,345,416  10/1967  Russell .................. 260/590
3,355,494  11/1967  Lyness et al. ............ 260/586

OTHER PUBLICATIONS
Morrison et al.; Chem. Abstr. Vol. 73, col. 35225m, 1970.

*Primary Examiner*—Donald G. Daus
*Assistant Examiner*—Mary C. Vaughn
*Attorney, Agent, or Firm*—Albert H. Graddis; Frank S. Chow

[57] ABSTRACT

The present invention relates to substituted-o-hydroxy-ω-(methylsulfinyl) acetophenones of the formula I.

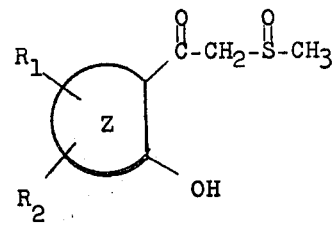

wherein Z is an aromatic or heteroaromatic nucleus such as benzene, naphthalene, anthracene, phenanthrene, pyridine, quinoline, isoquinoline, carbazole, benzothiazine, and the like, wherein $R_1$ is halogen, lower alkoxy, hydroxy, acetamino, alkyl, aralkyl, or aryl; $R_2$ is hydrogen, halogen, hydroxy, alkyl, aralkyl, or aryl; or $R_1$ and $R_2$ taken together may form a 1,3-dioxole ring. The compounds of the present invention are useful as intermediates for the production of chromones which exhibit anti-allergenic properties.

4 Claims, No Drawings

SUBSTITUTED-O-HYDROXY-ω-(METHYLSULFINYL)ACETOPHENONES AND PROCESS FOR PRODUCING SAME

This is a division, of application Ser. No. 174,947 filed Aug. 25, 1971, now U.S. Pat. No. 3,801,644.

As used throughout the specification and claims, the term "alkyl" and the "alkyl" portion of "alkoxy" embraces both straight and branched alkyl radicals containing from 1 to 9 carbon atoms, for example, methyl, ethyl, propyl, isopropyl, n-butyl, n-amyl, N-hexyl, 2-ethylbutyl, 2,3-dimethylbutyl and the like. The term halogen encompasses fluorine, bromine, chlorine and iodine. The term "aryl" denotes an aromatic hydrocarbon of 6 to 8 carbon atoms such as phenyl, tolyl and the like. The term "aralkyl" encompasses alkyl groups in which aryl as previously defined is substituted for a hydrogen atom such as for example benzyl, phenyl, ethyl, and the like. The term "acyl" means those hydrocarbon carboxylic acids of less than 12 carbon atoms as exemplified by the lower alkanoic acids, e.g., acetic, propionic, butyric, the aryl carboxylic acids, e.g., benzoic and toluic acid and the like.

The applicants had found in perfecting the process for the production of 3-(hydroxymethyl)chromones that an o-hydroxy-ω-(methylsulfinyl)acetophenone would serve as an intermediate for their production. This process and products are fully set forth in U.S. Pat. No. 3,798,240. One method of preparing o-hydroxy-ω-(methylsulfinyl)acetophenone is set forth in the J. Am. Chem. Soc. 85, at page 3413 (1963) as part of an article by Becker et al. The method of preparation described therein dissolves potassium-t-butoxide in DMSO and later reacting the resulting product with methyl salicylate. The yield reported was 18% of theory. The same method could be used to produce a variety of o-hydroxy-ω-(methylsulfinyl) acetophenones depending on the selection of starting reagents. The article concerns itself simply with the chemistry involved and gives no indication that such materials have any specific use.

Applicants in their present invention have determined that the unsubstituted-o-hydroxy-ω-methylsulfinyl acetophenone shown in Becker has no utility for the purposes of the present invention, in that the chromone produced using this compound as an intermediate has no oral anti-allergenic activity and further, when administered interperitoneally produces CNS side effects such as convulsions.

It is an object of the present invention to provide an improved method for the production of o-hydroxy-ω-(methylsulfinyl)acetophenones.

It is a further object of the present invention to provide intermediates from which pharmacologically active end compounds may be produced.

Another object of the present invention is to provide a method for the production of o-hydroxy-ω-(methylsulfinyl) acetophenones which is of high efficiency.

The process of the present invention may be stated generally as follows:

Sodium hydride which may be used as a dispersion in mineral oil is added to a mixture of DMSO (dimethyl sulfoxide) in an inert organic solvent. The solvent is chosen on the basis of it being inert to the reactants and its having a suitable boiling point in view of the temperatures at which the desired reaction takes place. For the purpose of the present invention, benzene is the preferred inert solvent. DMSO and benzene are placed in a reaction vessel and the vessel is then swept with nitrogen. The mixture is agitated by bubbling the nitrogen through it or by mechanical stirring or shaking. Sodium hydride (57% dispersion in mineral oil) may be added all at once or incrementally. The nitrogen atmosphere is maintained above the mixture, the agitation is continued, and the mixture is heated to a temperature in the range of 75° to 80° C for about three-fourths of an hour to 1 hour. This is the preferred range of temperature which should not be exceeded by much since temperatures much above this may cause decomposition of the sodium methylsulfinylmethide. If too much heat is added to the system, it may become explosive. Temperatures much lower than the preferred range, while operable decrease the reaction rate excessively. When the reaction is complete, the mixture in the vessel is cooled to about 35°C.

The second part of this process is that wherein an aromatic ester having hydroxy group in the ortho position with respect to the carboxyl group is added to the sodium methylsulfinyl methide in the reaction vessel incrementally while stirring or otherwise agitating the mixture. This reaction is exothermic. It is desirable to carry it out at such a rate that the temperature does not rise above 50°. The stirring is continued until such time as the temperature falls to about 25°, which usually is only a matter of about one-half hour. The reaction mixture is then diluted with ether. A precipitate forms which may be filtered out. The precipitate is washed with dry ether and then dissolved in ice water. The solution is filtered and the filtrate acidified with glacial acetic acid. A precipitate is formed.

The unsubstituted o-hydroxy-ω-(methylsulfinyl) acetophenone produced by this method is white, crystalline, has a melting point of 151° to 153° and is produced in a yield of 88% theory as contrasted with a yield of 18% theory following the procedure described by Becker et al.

This compound when used to prepare the corresponding unsubstituted chromone produced a compound which when screened for anti-allergenic properties showed none when administered orally to laboratory rats but did induce disturbances of the CNS such as convulsions when administered intraperitoneally.

The following examples are set forth by way of exemplification and not by way of limitation:

EXAMPLE 1

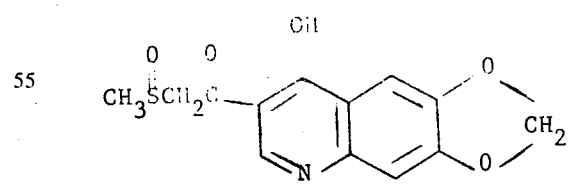

8-Hydroxy-1,3-dioxolo[4,5-g]quinolin-7-yl(methylsulfinyl) methyl ketone

This was prepared by reacting a solution of 27.5 g of NaH (57%) in a mixture of 360 ml of DMSO and 720 ml. of benzene with 47 g of ethyl 4-hydroxy-6,7-methylenedioxyquinoline-3-carboxylate* in analogous fashion to 3'-hydroxy-2-(methylsulfinyl)-2'- acetonaphthone. The material was recrystallized from DMF, mp. 201.5°–203°; yield 38 g. (71%)

Anal. Calc'd for $C_{13}H_{11}NO_5S$: C, 53.24; H, 3.78; S, 10.93. Found: C, 53.51; H, 3.89; S, 10.80.

*U.S. Pat. No. 3,287,458

EXAMPLE 2

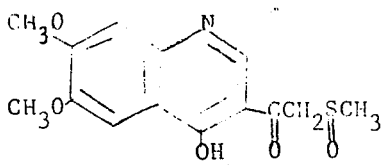

4-Hydroxy-6,7-dimethoxy-3-quinolyl(methylsulfinyl)methyl ketone

This was prepared by reacting 25.5 g of 4-hydroxy-6,7-dimethoxy quinoline-3-carboxylate* with a solution of 13.2 g of NaH in 360 ml of benzene and 180 ml of DMSO in analogous fashion to 3'-hydroxy-2-(methylsulfinyl)2'-acetonaphtone. The compound was recrystallized from DMF, mp. 223.5°–25.5°; yield 17 g (60%).

Anal. Calc'd for $C_{14}H_{15}NO_5S$: C, 54.36; H, 4.89; N, 4.53; S, 10.37. Found: C, 54.14; H, 4.97; N, 4.71; S, 10.34.

*J. Am. Chem. Soc., 68, 1264 (1946).

EXAMPLE 3

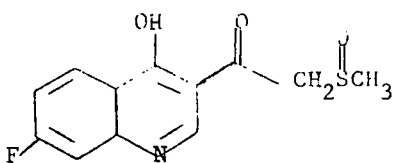

7-Fluoro-4-hydroxy-3-quinolyl (methylsulfinyl) methyl ketone (W7655

A mixture of dimethylsulfoxide (120 ml), benzene (200 ml), and 57% sodium hydride mineral oil dispersion (6.2 g, 0.15 mole) was heated at 75° to 80° with stirring under nitrogen until all the solid had dissolved to give a green solution.

Ethyl-4-hydroxy-7-fluoro-3-quinoline carboxylate* (11.75 g, 0.05 mole) was added to the ice cold solution of the dimethylsulfoxide anion with vigorous stirring. The reaction mixture was stirred at room temperature for one hour and poured into a large excess of ether. The yellow insoluble sodium salts were filtered, washed with ether, and dissolved in water. Acidification with acetic acid gave a pink crystalline solid. No further material was obtained by extraction with ethyl acetate. Recrystallization from absolute ethanol gave pure 7-fluoro-4-hydroxy-3-quinolyl (methylsulfinyl)-methyl ketone as pink crystals. mp. 202°–204°; yield, 4.81 g (36%).

Anal. Calc'd for $C_{12}H_{10}FNO_3S$: C, 53.93; H, 3.77; N, 5.24; S, 12.00 Found: C, 53.65; H, 3.78; N, 5.31; S, 12.17.

*J. Am. Chem. Soc., 69, 371, 374 (1947).

Having described our invention, what we desire to secure by Letters Patent is:

1. A compound of the formula:

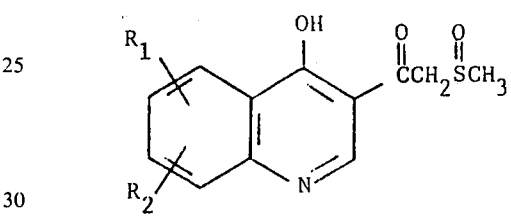

wherein $R_1$ is hydrogen, halogen or alkoxy having 1 to 6 carbon atoms in the alkyl residue, and $R_2$ is hydrogen or alkoxy having 1 to 6 carbon atoms in the alkyl residue and $R_1$ and $R_2$ taken together form a methylenedioxy group.

2. A compound according to claim 1 which is 8-hydroxy-1,3-dioxolo[4,5-g]quinolin-7-yl(methylsulfinyl) methyl ketone.

3. A compound according to claim 1 which is 4-hydroxy-6,7-dimethoxy-3-quinolyl(methylsulfinyl)-methyl ketone.

4. A compound according to claim 1 which is 7-fluoro-4-hydroxy-3-quinolyl (methylsulfinyl) methyl ketone.

* * * * *